US011994106B2

(12) United States Patent
Messing et al.

(10) Patent No.: US 11,994,106 B2
(45) Date of Patent: May 28, 2024

(54) METHOD FOR ADAPTING AN OPERATING CHARACTERISTIC OF A WIND POWER INSTALLATION

(71) Applicant: Wobben Properties GmbH, Aurich (DE)

(72) Inventors: Ralf Messing, Aurich (DE); Hendrik Schnell, Aurich (DE); Harro Harms, Wiesmoor (DE); Kemal Kartal, Bremerhaven (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/941,730

(22) Filed: Sep. 9, 2022

(65) Prior Publication Data

US 2023/0073582 A1 Mar. 9, 2023

(30) Foreign Application Priority Data

Sep. 9, 2021 (EP) ..................................... 21195819

(51) Int. Cl.
*F03D 7/02* (2006.01)

(52) U.S. Cl.
CPC ........ *F03D 7/0276* (2013.01); *F05B 2260/70* (2013.01); *F05B 2270/32* (2013.01); *F05B 2270/324* (2013.01); *F05B 2270/327* (2013.01)

(58) Field of Classification Search
None
See application file for complete search history.

(56) References Cited

U.S. PATENT DOCUMENTS

| 8,779,611 B2 * | 7/2014 | Kabatzke | F03D 7/0224 290/44 |
| 2012/0148402 A1 * | 6/2012 | Kabatzke | F03D 7/0276 416/1 |
| 2021/0017957 A1 | 1/2021 | Messing et al. | |
| 2022/0034296 A1 | 2/2022 | Messing et al. | |

FOREIGN PATENT DOCUMENTS

| DE | 10 2018 100 127 A1 | 7/2019 | |
| EP | 2 463 520 A2 | 6/2012 | |
| WO | 2020/007629 A1 | 1/2020 | |
| WO | WO-2020007629 A1 * | 1/2020 | ............. F03D 7/048 |
| WO | 2020/064925 A1 | 4/2020 | |

* cited by examiner

*Primary Examiner* — Juan G Flores
(74) *Attorney, Agent, or Firm* — Seed IP Law Group LLP (57) ABSTRACT

Provided is a method for adapting an operating characteristic of a wind power installation. The installation has a rotor with rotor blades having adjustable blade angles and operable with a variable rotor rotational speed. To control the installation, use is made of an operating characteristic which describes a relationship between the rotor rotational speed and an operating variable. The operating characteristic has a first portion with a first rotational speed range and a second portion with a second rotational speed range. The first rotational speed range has lower rotational speeds than the second rotational speed range, and the operating characteristic is adapted such that values of the operating variable of the first portion are increased values of the variable of the second portion are changed toward higher rotational speeds, and an expected total number of revolutions of the rotor over a predetermined lifetime of the installation remains approximately the same.

20 Claims, 3 Drawing Sheets

METHOD FOR ADAPTING AN OPERATING CHARACTERISTIC OF A WIND POWER INSTALLATION

BACKGROUND

Technical Field

The present invention relates to a method for adapting an operating characteristic of a wind power installation, and it relates to a method for controlling a wind power installation. In addition, the present invention relates to a corresponding wind power installation which uses a corresponding method for control purposes and/or uses an adapted operating characteristic.

Description of the Related Art

Wind power installations are known; they generate electrical power from wind. For this purpose, an aerodynamic rotor is rotated by the wind and generates electrical power by means of a generator connected to said rotor. The rotational speed of the rotor, i.e., the rotor rotational speed, and the electrical power of the generator can be controlled. The rotational speed and power depend on each other and, instead of the power, it is also possible to set the torque of the generator, i.e., the generator torque, or the power can be set by setting the torque of the generator.

In order to set the generator power or the generator torque, use is frequently made of operating characteristics, at least for a partial load range in which the wind speed has still not reached a nominal wind speed. However, such an operating characteristic may also be present in a transition from a partial load range into the full load range, the full load range describing a range in which the wind speed has reached the nominal wind speed or lies above it.

The predetermination of an operating characteristic is intended to predetermine in particular an optimum operating point of the wind power installation for the respective wind speed. Such an optimum operating point is a feature at which maximum power is extracted from the wind.

However, loadings to which the wind power installation is subjected should also be taken into consideration. In particular, high rotor rotational speeds generally subject the wind power installation to greater loadings than lower rotor rotational speeds. One type of loading here is what is referred to as a swivel load. A swivel load is a load which arises from the force of the weight applied to the rotor blade, in particular in the region of the blade root, in which the rotor blade is fastened to a hub of the wind power installation. Problems may affect not only the direct fastening region, but also a transition region which leads to the blade root or can be understood as being part of the blade root. In particular, there is frequently a transition between a metallic connection region and a region made from a different material, in particular glass fiber reinforced plastic.

In particular, the slow constant rotor rotational speed leads to a maximum swivel load acting on the rotor blade or particularly the region of the blade root approximately at a 3 o'clock position and a 9 o'clock position. In these two positions, the rotor blade is therefore horizontal in each case for the observed torque and, as a result, the maximum gravitational force acts on the rotor blade. This loading is opposed at the 3 o'clock position and the 9 o'clock position. Of course, there is also a loading because of the gravitational force in the positions in between. However, the loading is at the greatest in the two positions mentioned, and the positions are also best suited for describing the problem.

With each rotation of the aerodynamic rotor, the direction of the swivel load therefore changes twice and this change in direction leads in particular to the loading. Said loading which arises overall, i.e., including the loading due to the load change, can also be referred to as the swivel load.

Such swivel loads are superimposed on other loads that do not substantially matter in the present case and that can be ignored in order to explain the problem. Accordingly, there are therefore two load changes per rotor revolution for each rotor blade and thus the number of load changes is directly related to the number of revolutions. The quicker the rotor rotates, the more frequently there is therefore a load change and, accordingly, the loading due to swivel loads is correspondingly high.

In order to address this problem, a wind power installation is conventionally designed to be able to withstand a certain number of load changes over its service life. The wind power installation is basically designed for a certain number of load changes over its lifetime, and this means that it is designed for an absolute number of rotor revolutions.

Thus, although a wind power installation is designed for such swivel loads, the loading increases, however, if the rotational speed is increased because then more rotations occur as a whole and therefore more load changes occur, therefore the loading due to swivel loads increases and may potentially therefore also exceed a permissible amount.

This may in particular lead to an increase in the rotational speed not being possible, even if an increase in the rotational speed could otherwise be carried out, in particular because of remaining loadings. This has the disadvantage that an increase in power which could be achieved by increasing the rotational speed cannot be carried out either. The additional swivel loads may therefore lead to an increase in power that is otherwise possible not being able to be carried out.

BRIEF SUMMARY

As provided herein, an increase in the rotational speed, particularly for increasing the power, is made possible without exceeding a permissible amount of the swivel loads. Provided herein is increasing, or permitting to a high level, an increase in the overall energy yield of the wind power installation at least of annual energy production which maintaining permissible swivel loads.

A method is proposed. The method therefore relates to the adapting of an operating characteristic of a wind power installation. The wind power installation has a rotor with rotor blades, the blade angle of which is adjustable. Such an adjustment of the rotor blades is also referred to as pitching. The rotor, i.e., the aerodynamic rotor of the wind power installation, is operable with a variable rotor rotational speed. This means in particular also that the generator used for the wind power installation is likewise operable with a variable rotational speed.

In order to control the wind power installation, use is made of an operating characteristic which describes a relationship between the rotor rotational speed and at least one further operating variable. In particular, two types of operating characteristics are considered here, with the one describing a relationship between the rotor rotational speed and the power, while another describes a relationship between the rotor rotational speed and a torque of the generator.

The basic principle of such operating characteristics is otherwise similar or identical, however. The further operating variable, i.e., in particular the power or the generator torque, is set depending on a detected rotational speed, and therefore the operating point is defined. It may be the case here that the power which is set or the generator torque which is set does not yet lead to a stable operating point, i.e., does not match the wind speed, and therefore the rotational speed is changed and then a new value set for the operating variable until a stable operating point arises.

It is proposed that the operating characteristic has a first characteristic portion with a first rotational speed range, and a second characteristic portion with a second rotational speed range. The term rotational speed is also used synonymously here for the term rotor rotational speed. The first rotational speed range has lower rotational speeds than the second rotational speed range.

For this purpose, it is now proposed that the operating characteristic is adapted in such a manner that values of the operating variable of the first characteristic portion are increased and values of the operating variable of the second characteristic portion are changed toward higher rotational speeds.

In addition, it is proposed that the operating characteristic is adapted in such a manner that an expected total number of rotations of the rotor over a predetermined lifetime of the wind power installation remains approximately the same.

The operating variable is, to this extent, of course not the rotor rotational speed. In particular, the operating variable can be a power output or a generator torque. The power output corresponds to the generator power, and at least in the present consideration possible differences which may be caused by a power loss can be ignored. For the sake of simplicity, only the term power is used synonymously for the generator power or power output.

The purpose of the operating characteristic consists in selecting a stable and suitable operating point for the respective wind situation. For this purpose, depending on the rotor rotational speed, a power predetermined by the operating characteristic or a generator torque predetermined by the operating characteristic can be set. For the sake of simplicity, the relationship is explained with reference to the power. When the generator torque is used as the operating variable, the procedure is accordingly very similar, this furthermore being known to a person skilled in the art.

A power is therefore set in accordance with the operating characteristic depending on the rotor rotational speed. If said power corresponds to the power which is extracted from the wind by the aerodynamic rotor, the stable operating point has been found which, of course, changes again at a changing wind speed. If, however, the wind is more powerful, the rotor extracts power from the wind and is accelerated, and therefore the rotational speed is increased. Otherwise, the rotational speed is reduced. If the rotational speed is therefore increased, a new value for the power is read and set from the operating characteristic, and this procedure is repeated until said power corresponds to the power extracted at the moment from the wind.

In the case of a generator torque as the operating variable, the procedure is very similar. In this case, the generator torque is set in accordance with the characteristic until it corresponds to the torque which is produced from the action of the wind on the aerodynamic rotor.

The operating characteristic is conventionally a monotonously increasing characteristic, in particular a strictly monotonously increasing characteristic.

If, at fixed rotational speed values, values of the operating variable in the first characteristic portion are increased, this means that, at fixed values of the operating variable, rotational speed values are reduced. This is because the operating characteristic increases, at any rate in the first characteristic portion. To displace it upward is the same as displacing it to the left, to express it clearly. If, at a certain rotational speed, the power value or the torque is increased, this retards the rotational speed, i.e., a lower rotational speed occurs. The increase in the operating variable therefore has the effect of reducing the rotational speed.

In addition, it is proposed that the second characteristic portion is changed toward higher rotational speeds. In this aspect, in order to change the operating characteristic, it is particularly proposed that the rotor rotational speed also goes beyond a previous maximum rotor rotational speed, in particular beyond the previous rotor nominal rotational speed. If the second characteristic portion therefore reached previously as far as the nominal rotational speed, it can now reach as far as a value above the nominal rotational speed. This can be, for example, 5%-10%, with respect to the previous nominal rotational speed. The rotor nominal rotational speed can also be referred to in simplified and synonymous form as nominal rotational speed.

Accordingly, the proposed changes in the operating characteristic lead to the wind power installation being operated in the second characteristic portion with a higher rotational speed. Given the same wind conditions, the rotor rotational speed is therefore then higher.

Accordingly, it is precisely the other way around in the first characteristic portion. The increase in the values of the operating variable therefore leads to these values of the operating variable being assigned to lower rotor rotational speeds than previously. Given identical wind conditions, the wind power installation is therefore operated in the first characteristic portion with a lower rotational speed.

The wind power installation therefore runs with a higher rotational speed in the second characteristic portion and with a lower rotational speed in the first characteristic portion. As a result, a higher power can also be generated in the second characteristic portion. The higher rotational speed, which leads to higher swivel loads, is compensated for by the installation being operated at a lower rotational speed in the first characteristic portion and therefore the swivel loads being reduced there.

In general, such an adaptation of the operating characteristic can be carried out after the wind power installation has already been operated for at least one year, in particular has already been operated for several years. There are then sufficient measurement values for the location of the wind power installation that permit a good prediction as to how and for how long the wind power installation will be operated in the first characteristic portion and also in the second characteristic portion. As a result, the operating characteristic can be adapted to such an accurate extent that an expected total number of rotations of the rotor can be readily predicted and therefore a setting can be undertaken via the operating characteristic in such a manner that the expected total number of rotations of the rotor over the predeterminable lifetime of the wind power installation remains approximately the same.

The predetermined lifetime of the wind power installation relates in particular to the maximum service life for which the wind power installation is designed. It is optionally, however, also the case that such a predetermined lifetime is recalculated and therefore redetermined. Preferably, however, a starting point is a lifetime predetermined unchanged and which is therefore the same for the previous operating characteristic and also for the adapted operating characteristic.

It has been particularly recognized here that, on keeping or observing loading limits which therefore must not be exceeded, such an increase in the rotational speed is possible. In every case, there would be an increase in the swivel load, the increase, however, being able to be compensated for by the reduction in the rotational speed in the first rotational speed range, i.e., in the first characteristic portion. The effect which can thereby be achieved is an increase in power which is significantly higher than a reduction in power by the compensating reduction in the rotational speed in the first characteristic portion, i.e., in the first rotational speed range.

According to one aspect, it is proposed that the first rotational speed range lies above a switching-on rotational speed as far as a transition rotational speed, the transition rotational speed lying in the range of 80%-100% of a nominal rotational speed, and that the second rotational speed range lies at and above the transition rotational speed. It is therefore particularly proposed that the second rotational speed range and therefore the second characteristic portion lie at relatively high rotational speeds.

If the transition rotational speed is 100%, the second characteristic portion, at any rate prior to the change, is at 100% of the nominal rotational speed and therefore forms a vertical characteristic portion, which may also be referred to as the vertical branch. Its change toward higher rotational speeds can signify a displacement of said vertical branch.

It has particularly been recognized that, at high rotational speeds, a further, partially also low, increase in the rotational speed may lead to a comparatively great increase in power. This is particularly because an operating characteristic, in particular such an operating characteristic is proposed, toward such higher rotational speeds, i.e., rotational speeds above 80% of the nominal rotational speed, is comparatively steep. A great increase in power is therefore associated with a small increase in the rotational speed. Accordingly, such an operating characteristic is comparatively flat at lower rotational speeds, in particular below 80% of the nominal rotational speed, and therefore large reductions in rotational speed lead to only low reductions in power. As a result, in the first characteristic portion with comparatively low power losses, a compensation for the increase in the rotational speed can be created in the second characteristic portion, and therefore the operating characteristic as a whole is approximately neutral for all of the swivel loads.

In particular, it is proposed that the second characteristic portion is changed toward higher rotational speeds in such a manner that, after the adaptation of the operating characteristic, the second rotational speed range extends as far as a maximum rotational speed which lies above a nominal rotational speed. To this extent, the change in the second characteristic portion can also be referred to as the characteristic extension. The second characteristic portion is therefore extended toward greater rotational speeds.

It is therefore in particular proposed here that the rotational speed is increased beyond the nominal rotational speed. In particular, the effect which can be achieved by this aspect is that overall the rotational speed range in which the wind power installation is operated is increased to a maximum rotational speed above the nominal rotational speed. To observe the loadings, in particular to observe the swivel loads or to observe loading limits which are provided by the swivel loads, the rotational speed in the first rotational speed range can be reduced to compensate.

According to one aspect, it is proposed that the operating variable used is an operating power variable which is representative of a generator torque, a generator power or a power output, and therefore the operating characteristic specifies a relationship between the rotor rotational speed and the operating power variable.

The use of generator power or of the power output as the operating variable or the use of the generator torque as the operating variable has already been explained above. To this extent, this aspect clarifies that the operating characteristic specifies a relationship between the rotor rotational speed and the operating power variable, the relationship therefore being correspondingly set via the operating characteristic of the generator in order thereby to influence the power. This can then correspondingly take place by means of the generator torque, the generator power or a power output. The operating characteristic is therefore thus changed in respect of said operating power variable in order thereby to increase the power yield.

According to one aspect, it is proposed that the first characteristic portion lies completely in a partial load range in which the wind speed lies below a nominal wind speed, and/or the rotor rotational speed lies below a rotor nominal rotational speed. According to this aspect, it is proposed that the second characteristic portion lies at least partially in a full load range in which the wind speed reaches the nominal wind speed and in particular lies above same, and in which the rotor rotational speed is limited by adjustment of the rotor blades in their blade angle, wherein in particular the second characteristic portion comprises a transition region from the partial load region to the full load region, i.e., lies in said transition region.

The second characteristic portion therefore lies at comparatively high rotational speeds and goes as far as the full load region. It has been recognized here that, particularly in the transition to said full load region, an increase in the load output is also possible. At the beginning of the full load region, the rotor blades are conventionally rotated out of the wind in order no longer to extract the fully available power from the wind so as to protect the installation. At the beginning of the full load region, i.e., at wind speeds which lie only somewhat above the nominal wind speed, although the loading to which the rotor blades is subjected is very large, a loading is otherwise not yet very large and an increase in the rotational speed together with an increase in power is basically taken into consideration when considering the loads which occur. If, for this purpose, as is proposed, the rotational speed is also increased somewhat, the swivel loads are inevitably increased, but this can be compensated for by the lower rotational speed in the first characteristic portion. It is therefore possible in said transition region from the partial load region to the full load region to convert somewhat more of the wind power available there into electrical power and before the operating characteristic is adapted.

According to one aspect, it is proposed that the operating characteristic is adapted in such a manner that the rotor rotational speed in the second characteristic portion is increased at least partially via the rotor nominal rotational speed, i.e., via the nominal rotational speed, to a maximum rotational speed. The wind power installation is therefore operated with a rotational speed that is higher than the nominal rotational speed. As a result, as has already been explained, an increase in the power yield can be achieved.

For this purpose, it is proposed that for wind speeds above an increased wind speed which lies above a nominal wind speed and characterizes a highest wind speed of the second characteristic portion, and for wind speeds below a storm wind speed, from which the rotor rotational speed and rotor nominal rotational speed are reduced, the rotor rotational speed is reduced to a rotor rotational speed below the maximum rotational speed, in particular to the rotor nominal rotational speed. It is therefore proposed that the rotor rotational speed is increased via the rotor nominal rotational speed to the maximum rotational speed, but only for the second characteristic portion. After said second characteristic portion, i.e., for wind speeds which are no longer associated with said second characteristic portion, the rotational speed is reduced again, namely particularly to the nominal rotational speed. The nominal rotational speed is then maintained as far as the storm wind speed.

The effect basically achieved by this is that, at the beginning of the full load region, the installation is operated with an increased rotational speed. As a result, with a comparatively small increase in loading of the wind power installation, an increase in the power yield can be achieved. In particular, said maximum rotational speed is proposed for wind speeds above a nominal wind speed as far as the increased wind speed which characterizes the highest wind speed of the second characteristic portion, and which therefore, based on the wind speed, characterizes the end of the second characteristic portion.

According to one aspect, it is proposed that the wind power installation is erected at an erection site which is characterized by an elevation which specifies the height of the erection site, and the adaptation of the second characteristic portion is undertaken depending on the elevation of the erection site and/or depending on a mean air pressure at the erection site.

It has been particularly recognized here that erection sites at elevations, i.e., in particular in mountain regions, harbor a greater risk of stalling. The latter can be reduced by increasing the rotor rotational speed. A direct loading by the wind is reduced by the lower air density. However, a loading by the swivel loads is not reduced by the air pressure, but rather increased by the increased rotational speed because the number of load changes increases. However, it has been recognized that a compensation by reducing the rotational speed in another region can be provided.

In particular, it is proposed that values of the operating variable in the second characteristic portion are changed more powerfully toward higher rotational speeds, the higher the elevation and/or the lower the air pressure are/is, and in particular the maximum rotational speed is selected to be greater, the greater the elevation and/or the lower the air pressure are/is. By means of this consideration of elevation and/or air pressure, an increase in the power yield will therefore be readily realized by increasing the rotational speed. An increase in the loading due to increasing the swivel loads can be compensated for.

According to one aspect, it is proposed that a wind field and/or a temporal and/or local wind speed distribution in the region of the wind power installation is recorded as the wind characteristic, and the increase in the rotor rotational speed in the second characteristic portion is undertaken depending on the wind characteristic, wherein the rotor rotational speed in the second characteristic portion is increased more powerfully, the greater the local and/or temporal variation in the wind speed and/or the greater a detected gustiness is.

It has been particularly recognized here that a local and/or temporal variation in the wind speed and/or a great gustiness can also lead to temporally and/or locally briefly high wind speeds, which harbors the risk of stalling. This can be counteracted by increasing the rotor rotational speed. As a result, it is proposed that the operating characteristic is adapted depending on the wind characteristic. In particular, the second characteristic portion is correspondingly adapted, i.e., the rotor rotational speed there is increased. For this purpose, however, at the same time a reduction in the rotor rotational speed in the region of the first characteristic portion is proposed for compensation.

According to one aspect, it is proposed that at least one detection device, in particular at least one measuring instrument, for detecting a wind characteristic is provided on the wind power installation. The detection device (e.g., wind shear alert or detection system, wind turbulence alert or detection system, lidar, radar and/or anemometer, among others) is used to detect at least one wind property, namely at least wind shear, wind turbulence and/or a local wind speed distribution, wherein the operating characteristic is adapted depending on the detected wind property.

A further improvement in the swivel-load-optimized operational control can thereby be achieved. It is therefore proposed to equip the installations with suitable measuring instruments which can detect at least the wind speed, but better also shear and turbulence, in order to be able to determine an exact wind speed distribution. The more accurately the wind speed distribution at the location is known, the more accurately can the operational control be finely adjusted in order to maximize the yield. Such a detection device can be used also, for example, to readily detect wake effects. If, for example, it is thereby determined that, due to wake effects, the wind speed distribution is displaced toward lower wind speeds, a further raising of the maximum rotational speed above the nominal rotational speed can be carried out.

According to one aspect, it is proposed to adapt the operating characteristic depending on an azimuthal orientation, in particular that the increase in the rotor rotational speed in the second characteristic portion is carried out depending on an azimuthal orientation of the wind power installation. It has been recognized here that the wind characteristic at an erection site can generally be different in different wind directions, and thus depending on the azimuthal orientation. For example, depending on the wind direction, i.e., azimuthal orientation, the wind speed can vary to a differing degree. Rapidly rising wind speeds may cause stalling which is therefore of concern particularly if the wind speed varies greatly. Such stalling is therefore of concern in corresponding wind directions or the corresponding azimuthal orientations and is at least more likely there. For such azimuthal orientations, an increase in the rotational speed can reduce such a risk of stalling. However, this can then be provided only for corresponding azimuthal orientations.

It is therefore particularly proposed that the rotor rotational speed in the second characteristic portion is increased more powerfully, the more turbulent an average wind characteristic for a respective azimuthal orientation is. This is also based here on the concept that a turbulent average wind characteristic also has regions of high wind speed which may then lead to stalling. This can be avoided by an increased rotational speed.

In addition or alternatively, it is proposed that the increase in the rotational speed in the second characteristic portion is greater for an azimuthal orientation in which the wind power installation is located in a wake region of a further wind power installation than for an azimuthal orientation in which the wind power installation is not located in a wake of a further wind power installation. It has also been recognized here that turbulences can occur in a wake of a wind power installation and can lead to temporary higher wind speeds and therefore can lead to stalling.

In particular, it has been recognized that all this can be different for different azimuthal orientations. The proposal is derived from this to use different operating characteristics for different azimuthal orientations. It is therefore proposed that the operating characteristic is adapted depending on an azimuthal orientation.

According to one aspect, it is proposed that the increase in the rotor rotational speed in the second characteristic portion lies in the range of 2%-10%, in particular in the range of approximately 3%-8%, with respect to the nominal rotational speed. This is based particularly on the concept that, at an operating point which can be assigned to a wind speed, a rotor rotational speed is present or set in accordance with the characteristic and this rotor rotational speed is increased by the values mentioned in the second characteristic portion. In particular or alternatively, this also means that the second characteristic branch changes, in particular is displaced, by 2%-10%, in particular in the range of 3%-8% toward a higher rotational speed.

A uniform displacement means that the rotor rotational speed is generally increased by said percentage range. In particular, the increase can also vary in this range. In particular, it is proposed that the second characteristic portion is changed or extended toward higher rotational speeds by said range. On the basis of the fact that the second characteristic portion prior to adaptation extends as far as the nominal rotational speed, after adaptation it extends to a maximum rotational speed which lies 2%-10%, in particular 3%-8% above the nominal rotational speed.

A method for controlling a wind power installation is also proposed, wherein the wind power installation has a rotor with rotor blades, the blade angle of which is adjustable, the rotor is operable with a variable rotor rotational speed, and, in order to control the wind power installation, use is made of an adapted operating characteristic which describes a relationship between the rotor rotational speed and at least one further operating variable. The adapted operating characteristic has a first characteristic portion with a first rotational speed range, and a second characteristic portion with a second rotational speed range. The first rotational speed range has lower rotational speeds than the second rotational speed range, and the adapted operating characteristic is designed in such a manner that the operating variable of the first characteristic portion has increased values in relation to an operating characteristic identified as optimum. For this purpose, the operating variable in the second characteristic portion changes, in particular extends, toward higher rotational speeds in relation to an operating characteristic identified as optimum. The first and second characteristic portion of the adapted operating characteristic are coordinated with each other here in such a manner that an expected total number of rotations of the rotor over a predetermined lifetime of the wind power installation does not exceed a total number predetermined for the operating characteristic identified as optimum.

The wind power installation is therefore controlled with an adapted operating characteristic. The operating characteristic is adapted to this extent in relation to an operating characteristic identified as optimum. An operating characteristic identified as optimum is an operating characteristic based on a maximum power coefficient. The optimum operating characteristic is therefore set or is predetermined in such a manner that a maximum power can be extracted from the wind in the partial load mode, with loading limits being observed. The observing of loading limits is generally relevant only or essentially in the transition to the full load region. This particularly leads to optimum operating characteristics being based on a nominal rotational speed of the wind power installation, i.e., a nominal rotor rotational speed, as the maximum rotor rotational speed.

This is now deviated from by the adapted operating characteristic. In comparison thereto, the rotor rotational speed is increased in the second characteristic portion.

In the first characteristic portion, the operating variable is increased in relation to the operating characteristic identified as optimum, for compensation. For the same values of the rotor rotational speed, the operating variable therefore has higher values. This leads, as has already been explained above, to lower rotational speed values occurring at the same wind speeds in the first characteristic portion.

In particular, an increase in the rotational speed is achieved in the upper region of the operating characteristic, i.e., at large rotor rotational speeds, and in particular also in the transition region toward the full load region. The rotor rotational speeds are increased here more powerfully toward a loading limit. This is possible particularly by taking into consideration current and individual loading circumstances of the specific wind power installation at the specific erection site.

For compensation, the rotor rotational speed is reduced in the lower region of the operating characteristic, as a result of which the wind power installation is then no longer operated there at the optimum operating point. A loss of power arises, but it has been recognized that this is comparatively small since the power coefficient changes only to a very small extent with the rotational speed and therefore change in the tip-speed ratio as long as the changes to the rotational speed and therefore changes to the tip-speed ratio are not too great. It has namely been recognized that the power coefficient is maximally selected at the optimum operating characteristic. A characteristic which shows the power coefficient depending on the tip-speed ratio therefore has a maximum point at the tip-speed ratio selected for the optimum operating characteristic. However, this also means that it has the derivation zero in the region, i.e., in clear terms, has a plateau. If the tip-speed ratio is changed, the associated point in said characteristic changes only a little from zero because of the initial increase.

This finding is used here. At high rotational speeds where the consideration of loading limits is also important in the operating characteristic, increases in the rotational speed can lead to a great increase in power. The increased swivel loads can be compensated for by a reduction in the rotor rotational speed in a region in which the reduction in the rotational speed leads, however, only to a very small reduction in power.

According to one aspect, it is proposed that the operating characteristic identified as optimum is designed in such a manner that the wind power installation is operated in the first rotational speed range with an optimal tip-speed ratio at which a maximum power coefficient (Cp value) is reached, and that, when the operating characteristic is adapted, the wind power installation is not operated in the first rotational speed range with the optimum tip-speed ratio. It is therefore expressly proposed that an optimum tip-speed ratio, i.e., a maximum power coefficient, is at the basis of the optimum operating characteristic, and that said optimum operation is expressly left in the first rotational speed range when the operating characteristic is adapted.

It should be noted in this regard that it is a customary procedure for a person skilled in the art to design the operating characteristic for an optimum tip-speed ratio. This means that such an operating variable, in particular operating power variable, is in each case associated with a rotational speed, and that an optimum tip-speed ratio, i.e., a tip-speed ratio with a maximum power coefficient, arises at the relevant wind speed.

The maximum power coefficient, or even the power coefficient, also depends on the blade angle of attack. In the part load region, this is, however, frequently set to a constant value. Said blade angle can in each case assume the same and in particular constant value for the operating characteristic, at least in the first characteristic portion, i.e., in the first rotational speed range, both for the optimum operating characteristic and for the adapted operating characteristic. In other words, when the operating characteristics are changed, the blade angle for the adapted operating characteristic is preferably not changed in relation to the optimum operating characteristic. Even with the described adaptation of the operating characteristic, the blade angle is preferably not changed in the partial load region.

According to one aspect, at least one further operating characteristic is provided which differs from the adapted operating characteristic, and the adapted operating characteristic and the at least one further operating characteristic are used for different azimuthal orientations of the wind power installation. In addition or alternatively, it is proposed that wind characteristics are detected in the region of the wind power installation, and the adapted operating characteristic and the at least one further operating characteristic are used for different wind characteristics.

Furthermore, it is also or alternatively proposed that the rotor rotational speed in the second characteristic portion is greater for an azimuthal orientation in which the wind power is located in a wake region of a further wind power installation than for an azimuthal orientation in which the wind power installation is not located in a wake of a further wind power installation, wherein in particular the adapted operating characteristic is provided for the azimuthal orientation in which the wind power installation is located in the wake of the further wind power installation.

Thus, a further operating characteristic which is thus itself also an adapted operating characteristic and differs from the optimum operating characteristic is therefore provided. The further operating characteristic or else diverse further operating characteristics can be created for different conditions and then correspondingly used. For this purpose, it is particularly proposed to use different operating characteristics for different azimuthal orientations.

From measurements which have been recorded during the operation of the wind power installation, or from a survey of the erection site of the wind power installation, differences for different azimuthal orientations may be known. This is used and proposed for assigning different operating characteristics to different azimuthal orientations. It has particularly also been recognized that an azimuthal orientation can easily be identified since it is in any case a variable of the operational control of the wind power installation and, as a result, a corresponding operating characteristic, namely the adapted operating characteristic or at least one further operating characteristic, can easily be selected.

The importance of the different wind conditions which may occur for different azimuthal orientations has already been described above in conjunction with the adaptation of the operating characteristic. These findings are also used here for the matter of which rotor rotational speed is in each case expedient for which wind situations.

It is also taken into consideration that, additionally or alternatively, wind characteristics in the region of the wind power installation are detected. Then, depending on the detected operating characteristics, the adapted operating characteristic or at least one further operating characteristic can be selected. For the selection, the wind characteristic can be particularly characterized by a value, such as, for example, gustiness. For example, a gustiness can be characterized in a range of 0-1, wherein 0 means that no gusts at all occur, and the value 1 means that a maximum gustiness is present. Of course, other characteristic values and/or wind characteristics are also possible. The importance of different wind characteristics has already been explained above.

In particular, it is proposed that the adapted operating characteristic and, if present, the at least one further operating characteristic have in each case been adapted by a method for adapting an operating characteristic according to at least one of the embodiments explained in this regard above or according to an aspect explained in this regard above. The advantages which have been described for adapting an operating characteristic can therefore be used in an advantageous manner for controlling the wind power installation. The wind power installation is therefore then no longer controlled with the previously used optimum operating characteristic, but rather with the adapted operating characteristic, optionally, depending on the situation, with a further operating characteristic.

A wind power installation is also proposed which has a rotor with rotor blades, the blade angle of which is adjustable, and an installation controller for controlling the wind power installation, wherein the rotor is operable with a variable rotor rotational speed, and, in order to control the wind power installation, use is made of an operating characteristic which describes a relationship between the rotor rotational speed and at least one operating variable. It is proposed that the operating characteristic is implemented in the system controller and has a first characteristic portion with a first rotational speed range, and a second characteristic portion with a second rotational speed range. The operating characteristic is adapted here in relation to a previous operating characteristic in such a manner that values of the operating variable of the first characteristic portion have been increased, and values of the operating variable of the second characteristic portion have been changed toward higher rotational speeds, and that the operating characteristic is adapted in such a manner that an expected total number of rotations of the rotor over a predetermined lifetime of the wind power installation has remained approximately the same.

In particular, it is proposed that the operating characteristic of such a wind power installation has been adapted in relation to the previous operating characteristic according to a method according to one of the above-described embodiments or aspects for adapting an operating characteristic. A wind power installation is therefore proposed which has an adapted and therefore improved operating characteristic in order to further increase a power yield.

According to one aspect, a wind power installation is also proposed which is controlled by a method according to one of the above-described embodiments or aspects which relate to the control of a wind power installation. The wind power installation is optionally designed such as has been described above for a wind power installation according to at least one embodiment and one aspect.

BRIEF DESCRIPTION OF THE SEVERAL VIEWS OF THE DRAWINGS

The invention is explained in more detail below by way of example using embodiments with reference to the accompanying drawings.

DETAILED DESCRIPTION

Figure 1:
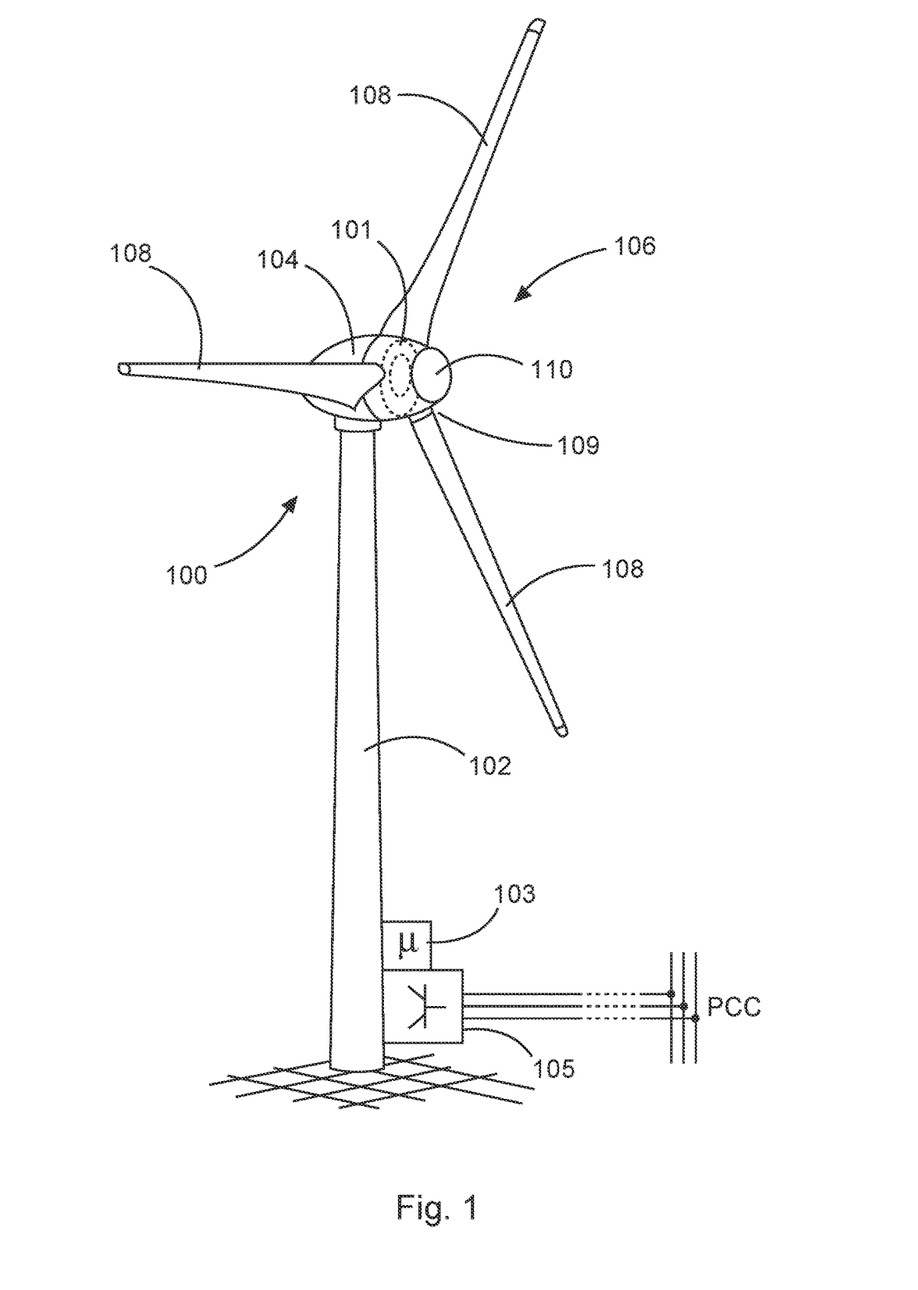
FIG. 1 shows a wind power installation in a perspective illustration.

FIG. 1 shows a schematic illustration of a wind power installation according to the disclosure. The wind power installation 100 has a tower 102 and a nacelle 104 on the tower 102. An aerodynamic rotor 106 with three rotor blades 108 and a spinner 110 is provided on the nacelle 104. During operation of the wind power installation, the aerodynamic rotor 106 is set in a rotary motion by the wind, and therefore also rotates an electrodynamic rotor of a generator, which is coupled to the aerodynamic rotor 106 directly or indirectly. The electrical generator is arranged in the nacelle 104 and generates electrical energy. The pitch angles of the rotor blades 108 can be varied by pitch motors on the rotor blade roots 109 of the respective rotor blades 108.

In this case, the wind power installation 100 has an electrical generator 101, indicated in the nacelle 104. Electrical power can be generated by means of the generator 101. An infeed unit 105, which can be configured as an inverter, in particular, is provided for feeding in electrical power. It is thus possible to generate a three-phase infeed current and/or a three-phase infeed voltage according to amplitude, frequency and phase, for infeed at a network connection point PCC. This can be effected directly or else jointly with further wind power installations in a wind farm. An installation controller 103 is provided for controlling the wind power installation 100 and also the infeed unit 105. The installation controller 103 can also acquire predefined values from an external source, in particular from a central farm computer.

Figure 2:
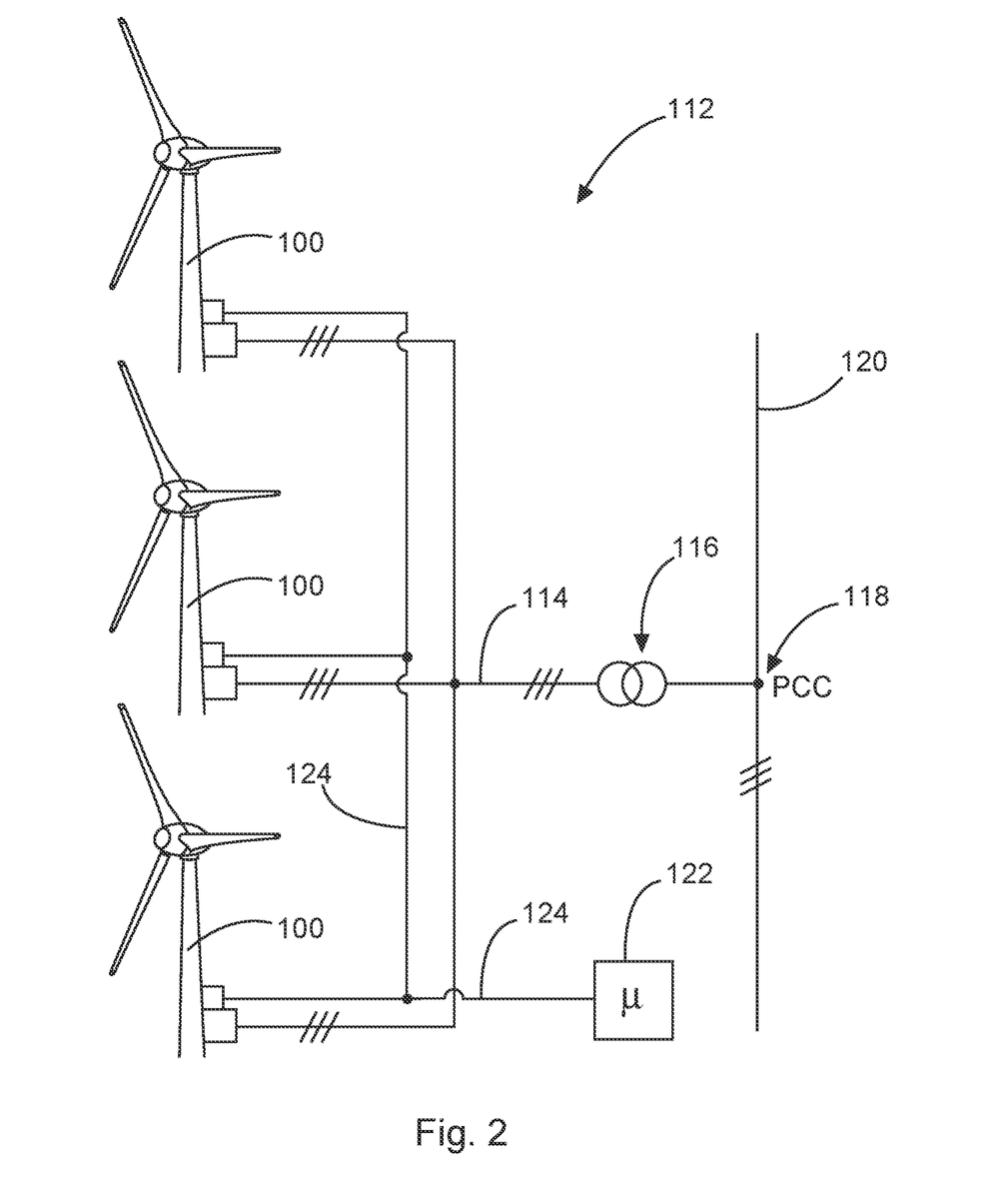
FIG. 2 shows a wind farm in a schematic illustration.

FIG. 2 shows a wind farm 112 comprising for example three wind power installations 100, which can be identical or different. The three wind power installations 100 are thus representative of basically an arbitrary number of wind power installations of a wind farm 112. The wind power installations 100 provide their power, namely in particular the generated current, via an electrical farm network 114. In this case, the respectively generated currents or power of the individual wind power installations 100 are added and a transformer 116 is usually provided, which steps up the voltage in the farm in order then to feed it into the supply network 120 at the infeed point 118, which is also generally referred to as PCC. FIG. 2 is merely a simplified illustration of a wind farm 112. By way of example, the farm network 114 can be configured differently, with for example a transformer also being present at the output of each wind power installation 100, to mention just one different exemplary embodiment.

Figure 3:
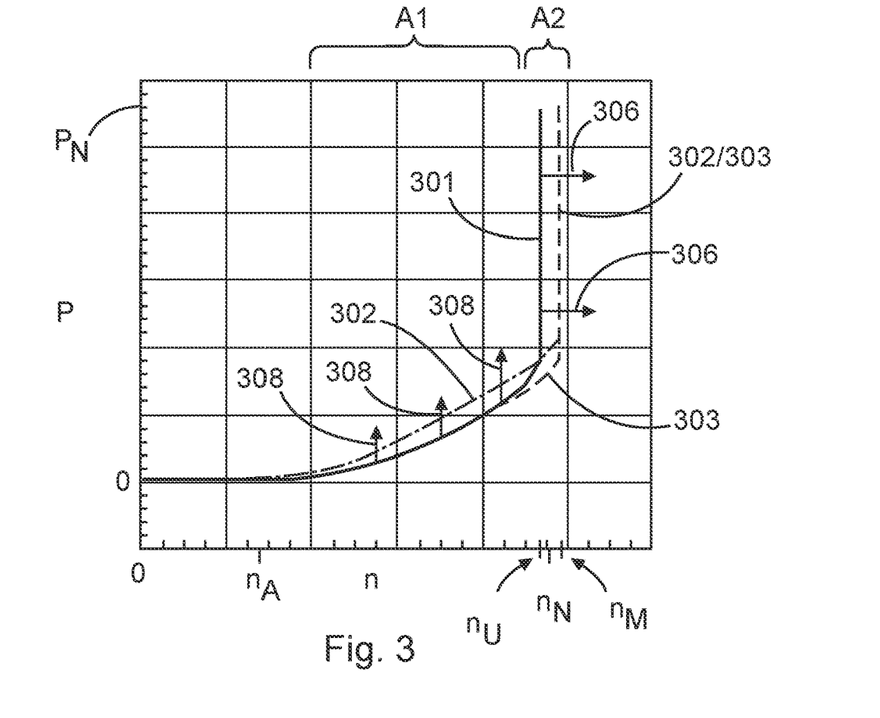
FIG. 3 shows a diagram in which a plurality of operating characteristics are compared.

FIG. 3 shows a diagram in which three operating characteristics are compared. In this example, the three operating characteristics indicate a relationship between the rotor rotational speed n and the generator power P. The generator power P is therefore an operating variable. Instead of the generator power P, a different power or a generator torque may also be used as the operating variable. All of the characteristics therefore indicate at which rotational speed which generator power should be set. The diagram therefore extends from 0 power to nominal power $P_N$. For rotor rotational speeds, it extends from the rotational speed 0 to somewhat beyond the nominal rotational speed $n_N$. Approximately in the region of the nominal rotational speed $n_N$, all of the operating characteristics show a vertical curve which, however, may also have a small gradient.

Three operating characteristics are depicted in FIG. 3. The previous operating characteristic 301 is a characteristic which is designed particularly for a new wind power installation. In particular, it is an optimum operating characteristic on the basis of underlying wind conditions.

In addition, an operating characteristic 302 configured and which arises after configuration of the previous operating characteristic 301 is depicted.

Furthermore, an alternative operating characteristic 303 is also depicted which serves only for the purpose of explanation and which partially coincides with the adapted operating characteristic 302, namely particularly in the steep region in the vicinity of the nominal rotational speed $n_N$.

Like all of the operating characteristics at a rotational speed with the value 0, the previous operating characteristic 301 also has a power value of 0. At the starting rotational speed $n_A$, the operation of the wind power installation begins, for example, in such a manner that an amount of power is generated, i.e., the power value thus rises slowly as the rotational speed increases. It should be emphasized that operating characteristics are not a time-dependent curve, but rather reproduce stationary operating states. When the installation is started up, it is conventionally the case that, after a starting wind speed is reached, the installation begins to rotate, and then the rotational speed is increased and then, after the starting rotational speed $n_A$ is reached, the power is switched on and then increased if the wind speed increases further. If, however, the wind speed does not increase further, the operation of the wind power installation can also be continued with a rotational speed only just above the starting rotational speed $n_A$ and with lower power P.

At any rate, an operating point of the wind power installation, which is therefore characterized by rotational speed and power, moves along the characteristic, i.e., here initially along the previous operating characteristic 301, if the wind speed increases further. However, depending on the wind speed, an arbitrary operating point can also be retained on said rotational speed/power characteristic.

Approximately at a nominal rotational speed $n_N$, the previous operating characteristic 301 essentially reaches its maximum rotational speed value, which namely corresponds to the nominal rotational speed $n_N$, wherein the power can continue to vary depending on the wind speed. For regulation reasons which are not relevant here, this branch which is depicted virtually vertically may be oblique at the nominal rotational speed $n_N$ and does not have to be precisely vertical.

In order to adapt the operating characteristic, i.e., in order to change the previous operating characteristic 301 into the adapted operating characteristic 302, a first rotational speed range A1 and a second rotational speed range A2 are considered. The first rotational speed range A1 extends from a starting rotational speed $n_A$ as far as a transition rotational speed nu, and the second rotational speed range A2 extends from the transition rotational speed nu as far as the maximum rotational speed $n_M$ or at least as far as the nominal rotational speed $n_N$. The part of the respective operating characteristic that lies in the first rotational speed range A1 is therefore a first characteristic portion, and the part of the respective characteristic that lies in the second rotational speed range is therefore a second characteristic portion.

In order to adapt the operating characteristic, it is now proposed that values of the operating variable, i.e., here power values P of the second characteristic portion, are changed toward higher rotational speeds, i.e., the second characteristic portion is extended toward higher rotational speeds. Basically, the second characteristic portion is displaced here to the right according to FIG. 3, i.e., toward higher rotational speeds. This is indicated by rotational speed increase arrows 306. The second rotational speed range A2 of the previous operating characteristic 301 essentially extends only from a rotational speed just below the nominal rotational speed $n_N$ as far as the nominal rotational speed $n_N$. This second rotational speed range A2 has now been extended to such an extent that it is now extended as far as a maximum rotational speed $n_M$. The rotational speed can therefore now extend as far as this higher value of the maximum rotational speed $n_M$.

It should be noted that, for the sake of better clarity, the second rotational speed range as the second rotational speed range both for the previous operating characteristic 301 and for the adapted operating characteristic 302 (and later also for the alternative operating characteristic 303) is always referred to as A2 although the second rotational speed range of the adapted operating characteristic 302 is extended and comprises a larger rotational speed range here than the previous operating characteristic 301.

Of course, it should also be noted here that, although the second rotational speed range A2 is fairly small, there is a large power span in the second rotational speed range A2 in the second characteristic portion of the adapted operating characteristic 302. The power can namely vary depending on wind speed, and different power values can be provided, with only a small variation in the rotational speed.

It should also be taken into consideration that the operating characteristics, i.e., all three operating characteristics 301 to 303, in the practical implementation can partially also be realized with the aid of a control, in particular a rotational speed control. A realization by means of a rotational speed control can be provided particularly in the very steep branch of the second characteristic portion, in particular if the latter is vertical. Such a rotational speed control controls the rotational speed, i.e., the rotor rotational speed, of the wind power installation to the value shown, with the power P being the correcting variable. The power which is extracted has to be set to a greater magnitude the greater the wind speed is, in order to maintain the rotational speed. The generator power arising when the rotational speed is adjusted therefore corresponds to the power which is assigned to the current wind speed without the wind speed needing to be detected for this purpose. A point arises on the relevant operating characteristic. If such a controller has an integral portion, a vertical branch of the operating characteristic can even be realized. In the event of a pure P control, the branch should not be completely vertical, but rather should have a high gradient.

The adapted operating characteristic 302 therefore leads in the second rotational speed range A2 to an increased rotor rotational speed. The total number of revolutions for the lifetime of the wind power installation would therefore be increased. In order to compensate for this, it is proposed to reduce the rotational speed in the first rotational speed range A1, which can be identical for all three operating characteristics shown. This is effected by the values of the operating variable, the values of the generator power P, being increased. This is indicated by power increase arrows 308. By increasing the power values in accordance with the power increase arrows 308, the previous operating characteristic 301 is therefore changed toward the adapted operating characteristic 302 and therefore adapted. This increase in the power values corresponds to a reduction in the rotational speed. This first characteristic portion of the previous operating characteristic 301 in the first rotational speed range A1 deploys the same effect as a change in said first characteristic portion to the left, i.e., toward lower rotor rotational speed values.

At any rate, this creates an adapted operating characteristic 302 which achieves an increase in the rotational speed in the second rotational speed range A2, and results in a reduction in the rotor rotational speed in the first rotational speed range A1. This rotor rotational speed increase in the second rotor rotational speed range A2 and the rotor rotational speed reduction in the first rotational speed range A1 are coordinated with each other in such a manner that, as a result, an expected total number of rotations of the rotor over the predetermined lifetime of the wind power installation remains approximately the same, i.e., the same as in the case of the previous operating characteristic 301.

Basically, the procedure can thus be that, in order to improve the power yield, in particular also to avoid stalling in the second rotational speed range A2, a rotational speed increase is carried out. It is theoretically also possible to carry out only this rotational speed adaptation and precisely this is shown by the alternative operating characteristic 303. In the alternative operating characteristic 303, the rotor rotational speed is therefore essentially increased only in comparison to the previous operating characteristic 301, but this leads to a higher total number of rotations of the rotor over the predetermined lifetime of the wind power installation and therefore leads to too high a loading of the wind power installation or is impermissible because of such an increased loading.

It is basically proposed as a remedy, in comparison to the change in the alternative operating characteristic 303, to additionally adapt the previous operating characteristic 301 in the first rotational speed range A1 by reducing the rotational speed. This can be effected by increasing the values of the operating variable in the range, as the power increase arrows 308 indicate.

Figure 4:
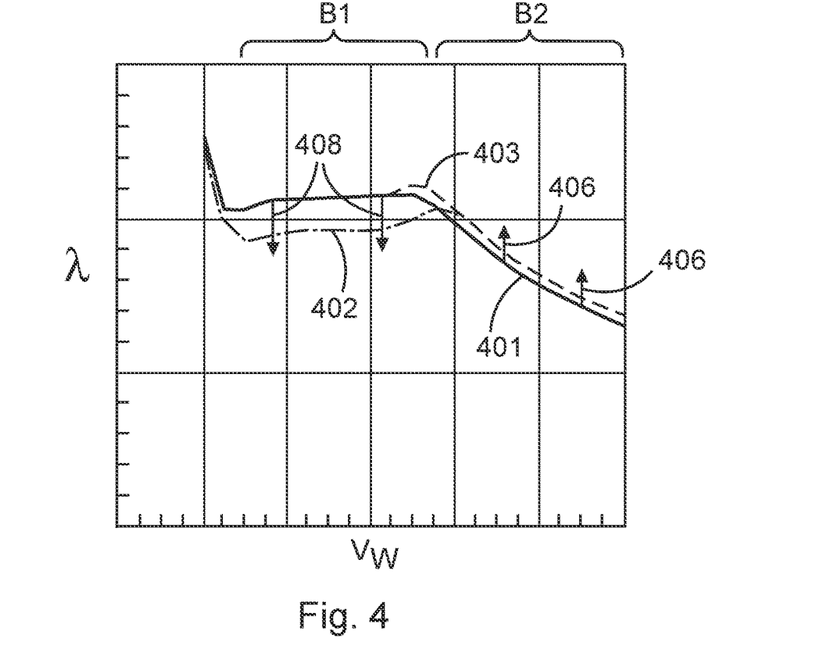
FIG. 4 shows a diagram in which a plurality of curves of the tip-speed ratio depending on the wind speed are compared, the curves corresponding to the operating characteristics of FIG. 3.

FIG. 4 shows three characteristics which each show the curve of a tip-speed ratio λ, depending on the wind speed $V_W$. Following FIG. 3, FIG. 4 therefore shows a previous λ, characteristic 401, an adapted λ, characteristic 402 and an alternative λ, characteristic 403.

FIG. 4 is used only for illustrative purposes and therefore variables are not depicted either for the tip-speed ratio λ, or the wind speed $V_W$. Of course, however, the values for the wind speed $V_W$ increase to the right and, for the tip-speed ratio k, increase upward.

The previous λ, characteristic 401 is essentially selected in such a manner that an optimum power coefficient is produced, at least in the first wind speed range B 1. It is pointed out by way of precaution that the tip-speed ratio is defined as the quotient of a blade tip speed to the wind speed. The blade tip speed is therefore the speed of the blade tip of a rotor blade of the rotor of the wind power installation and may also be referred to as revolving speed. The tip-speed ratio λ, is therefore also an important variable for the aerodynamic behavior of the rotor because said quotient of blade tip speed to wind speed has an influence on the actual incident flow angle of the rotor blade. This in turn has an influence on whether stalling need be a concern.

Therefore, particularly at high wind speeds, a high rotor rotational speed and therefore a high tip-speed ratio may be desirable. Accordingly, particularly in the second wind speed range B2, an increase in the tip-speed ratio is proposed, this being indicated in FIG. 4 as a tip-speed ratio increase 406. This increase is proposed both for the adapted λ, characteristic 402 and for the alternative 403.

However, for compensation, a λ, reduction 408 is proposed for the adapted λ, characteristic 402. A reduction in the rotor rotational speed and therefore in the tip-speed ratio in the first wind speed range B1, i.e., at low wind speeds, does not so easily lead to a risk of stalling, and therefore this compensation can be readily carried out. Furthermore, this reduction in the rotor rotational speed and in the tip-speed ratio in the first wind speed range B1 also leads only to a small reduction in the power coefficient, so that only a small amount of power is also lost and this is acceptable in view of the large gain in power in the second wind speed range B2.

Basically, the first wind speed range B1 can be assigned to the first rotational speed range A1 and the second wind speed range B2 to the second rotational speed range A2. It will also become clear here that both wind speed ranges B1 and B2 can be of a similar size. When the second wind speed range B2 is reached, there is therefore already a comparatively high rotor rotational speed which, as the wind in the region of the second wind speed range B2 rises, no longer or no longer substantially increases. As has been explained, as the wind speed rises, the generator power P is increased further, even in the second wind speed range B2.

The alternative λ characteristic 403 basically shows a desirable curve, in which the λ characteristic in the first wind speed range B1 reaches high values in which there is a high power coefficient. The alternative λ characteristic 403 is therefore optimum in the first wind speed range B1. It is also increased in the second wind speed range B2, and can achieve the advantages which have already been explained regarding the rotational speed increase or increase in the tip-speed ratio. However, the swivel loads are increased, and this may lead to a high overall loading, in particular to an impermissibly high loading by the swivel loads, and therefore this otherwise perhaps desirable alternative λ characteristic 403 is not possible. In order nevertheless to exhaust the described advantages as far as possible, the adapted λ characteristic 402 which is lowered in the first speed range B1 is proposed. However, it has been recognized that the disadvantages due to this reduction are comparatively small.

The following has been particularly recognized herein.

The increase in the nominal rotational speed is a tried and tested means for increasing the yield of a wind power installation. The installation typically achieves better aerodynamic power coefficients since, at a higher nominal rotational speed, the installation can be operated for longer at the optimum tip-speed ratio and, even after departing from the optimum tip-speed ratio, the installation is operated at greater tip-speed ratios than during operation at reduced nominal rotational speeds.

However, the increase in nominal rotational speeds is subjected to limitations. One important limitation is the observing of maximum noise output levels. If such a predefined value is present and the installation already reaches this maximally permitted noise output level when the nominal rotational speed is not increased, an increase in a nominal rotational speed in order to increase the yield conventionally cannot be implemented. Such regulatory predefined values are either temporarily or entirely not present at many locations.

In many practical situations, a further very important restriction is the load budget for the installation, here in particular the swivel loads and here in particular the operating swivel loads. For simplification purposes here, the swivel loads are equated with operating swivel loads. The operating swivel loads are generated in a good approximation primarily by the number of the revolutions in the operating service life of the installation. An increase in the nominal rotational speed would inevitably lead to a greater number of revolutions and possibly to exceeding the certified loads. It would then not be possible to obtain a gain in yield since the designated measure of increasing the nominal rotational speed cannot be realized for load reasons.

The increase in the nominal rotational speed, i.e., the increase in the rotational speed or in a maximum rotational speed above a previous nominal rotational speed, is particularly advantageous and desirable if the installation has a rotor blade which is subjected during operation to flow separation phenomena. Flow separation can synonymously also be referred to as stalling. This flow separation phenomenon can occur, for example, at locations in which the air density has been reduced in comparison to the air density for which the rotor blade has been designed for operation. This is especially the case for locations in mountain regions. At such locations, it may regularly occur that a flow separation occurs at the rotor blade at wind speeds before reaching the nominal power of the installation.

In such a case, the increase in the rotational speed, or nominal rotational speed, is a particularly targeted measure since flow separations are counteracted by the associated increase in the tip-speed ratio and the resultantly induced reduction in the blade angles of attack, and power losses associated therewith are prevented.

In summary, it can therefore be established that nominal rotational speed increases have an advantageous aerodynamic effect, and lead to more efficient power conversion at the rotor blade, and therefore to increases in yield. This applies both to rotor blades around which the flow passes aerodynamically neatly, i.e., without the occurrence of flow separations, and to rotor blades which are operated critically in this regard, i.e., in operating states with flow separations occurring temporarily or permanently.

The increase in the nominal rotational speed, i.e., the increase in the rotational speed above the previous nominal rotational speed, is, however, limited by increased operating swivel loads, and therefore the full potential for increasing the yield cannot be exhausted. The object accordingly consists in establishing an approach to being able to carry out an increase in the nominal rotational speed, i.e., the increase in the rotational speed above the previous nominal rotational speed, without exceeding installation loads, especially the operating swivel loads. In other words, the object consists in finding an operational control which is optimized in respect of swivel loads.

In principle, the approach in the operational control which is optimized in respect of swivel loads consists in keeping the number of revolutions constant over the lifetime of the installation. If the nominal rotational speed is now increased, as has been described as being advantageous in the previous paragraph, the rotational speeds have to be reduced in another operating region of the installation in order to keep the number of revolutions constant.

This takes place in the partial load region by reducing the partial load tip-speed ratio. Of course, power reductions then have to be expected in the partial load region since it can be assumed that the installation to date has been operated with an optimum partial load tip-speed ratio. Overall, an increase in yield can then be expected if the increase in power by increasing the nominal rotational speed is greater than the power reduction in the partial load region.

If the parameters of nominal rotational speed and partial load tip-speed ratio are carefully selected, for example using numerical optimization tools, the desired increase in yield in total can be achieved. This applies particularly at locations where a flow separation occurs in the region before the nominal power is reached, e.g., at locations with a lower air density, since the increase in yield here can turn out to be particularly large by avoiding the flow separation.

The operational control which is optimized in terms of swivel load can be implemented in accordance with the wind speed distribution at the location and is therefore location-specific. The better the wind speed distribution at the location is known, the better can the operational control be optimized and therefore ultimately the gain in yield. However, the wind speed distributions are often only inadequately known, in particular in large wind farms for installations which are frequently located in the wake of installations located upstream.

To further improve the operational control which is optimized in terms of swivel load, it is therefore proposed to equip the installations with suitable measuring instruments which can detect at least the wind speed, but better also shear and turbulence, in order to be able to determine a precise wind speed distribution. The more accurately the wind speed distribution at the location is known, the more accurately the operational guide can be finely adjusted in order to maximize the gain in yield. If it is established, for example, that, due to wake effects, the wind speed distribution is displaced toward smaller wind speeds, a further increase in the nominal rotational speed could be taken into consideration.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for configuring an operating characteristic of a wind power installation,
wherein:
the wind power installation has a rotor, and the rotor has rotor blades having adjustable blade angles, and
the rotor is operable with a variable rotor rotational speed, and
wherein the method comprises:
controlling the wind power installation using the operating characteristic, wherein the operating characteristic represents a relationship between the variable rotor rotational speed and an operating variable, wherein the operating characteristic has a first characteristic portion with a first rotational speed range, and a second characteristic portion with a second rotational speed range, wherein the first rotational speed range has lower rotational speeds than the second rotational speed range; and
configuring the operating characteristic by:
increasing values of the operating variable of the first characteristic portion;
changing values of the operating variable of the second characteristic portion towards higher rotational speeds; and
increasing a rotational speed of the wind power installation in the second characteristic portion and decreasing a rotational speed of the wind power installation in the first characteristic portion, such that an expected total number of revolutions of the rotor over a predetermined lifetime of the wind power installation remains substantially the same.

2. The method as claimed in claim 1, wherein:
the first rotational speed range is greater than a switching-on rotational speed and up to a transition rotational speed, and the transition rotational speed is 80% to 100% of a nominal rotational speed, and
the second rotational speed range is at and above the transition rotational speed.

3. The method as claimed in claim 2, wherein the second characteristic portion is changed toward higher rotational speeds such that, after configuring the operating characteristic, the second rotational speed range extends up to a maximum rotational speed, which is greater than a nominal rotational speed.

4. The method as claimed in claim 1, wherein the operating variable is an operating power variable, the operating variable is representative of a generator torque, a generator power or a power output, and the operating characteristic represents a relationship between the variable rotor rotational speed and the operating power variable.

5. The method as claimed in claim 1, wherein:
the first characteristic portion is completely in a partial load region in which a wind speed is below a nominal wind speed or the variable rotor rotational speed is below a rotor nominal rotational speed, and
the second characteristic portion is at least partially in a full load region in which the wind speed reaches the nominal wind speed, and the variable rotor rotational speed is limited by adjustment of the adjustable blade angles.

6. The method as claimed in claim 5, wherein the second characteristic portion includes a transition region from the partial load region to the full load region.

7. The method as claimed in claim 1, wherein:
the operating characteristic is configured such that the variable rotor rotational speed in the second characteristic portion is increased at least partially via a rotor nominal rotational speed to a maximum rotational speed, and
for wind speeds greater than an increased wind speed, which is greater than a nominal wind speed and characterizes a highest wind speed of the second characteristic portion, and below a storm wind speed, from which the variable rotor rotational speed is reduced below the rotor nominal rotational speed, the variable rotor rotational speed is reduced to a rotor rotational speed below the maximum rotational speed.

8. The method as claimed in claim 1, wherein:
the wind power installation is erected at an erection site having an elevation representing a height of the erection site, and
the second characteristic portion is configured depending on the elevation of the erection site or on a mean air pressure at the erection site.

9. The method as claimed in claim 8, wherein as the elevation increases or an air pressure decreases, values of the operating variable of the second characteristic portion are changed faster to higher rotational speeds.

10. The method as claimed in claim 9, wherein as the elevation increases or the air pressure decreases, a maximum rotational speed is changed to a higher rotational speed.

11. The method as claimed in claim 1, comprising:
recording a wind field, a temporal wind speed distribution or a local wind speed distribution in a region of the wind power installation as a wind characteristic;
configuring the operating characteristic depending on the wind characteristic;
increasing the variable rotor rotational speed in the second characteristic portion depending on the wind characteristic; and
increasing the variable rotor rotational speed in the second characteristic portion faster as a local or temporal variation in the wind speed increases or as a detected gustiness increases.

12. The method as claimed in claim 1, wherein:
the wind power installation includes at least one detection device for detecting a wind characteristic,
the at least one detection device detects at least one wind property of wind from a list of wind properties including:
wind shear,
wind turbulence, and
a local wind speed distribution, and
the operating characteristic is configured depending on the detected at least one wind property.

13. The method as claimed in claim 1, comprising:
configuring the operating characteristic depending on azimuthal orientation of the wind power installation, wherein:
the variable rotor rotational speed increase in the second characteristic portion depends on the azimuthal orientation, wherein at least one of:
the variable rotor rotational speed in the second characteristic portion is increased faster, the more turbulent an average wind characteristic for a respective azimuthal orientation, or
the increase in the variable rotor rotational speed in the second characteristic portion is greater for an azimuthal orientation in which the wind power installation is located in a wake region of a further wind power installation than for an azimuthal orientation in which the wind power installation is not located in a wake of a further wind power installation.

14. The method as claimed in claim 1, wherein the increase in the variable rotor rotational speed in the second characteristic portion is 2 to 10% in relation to a nominal rotational speed.

15. A method for controlling a wind power installation, wherein:
the wind power installation has a rotor, and the rotor has rotor blades having adjustable blade angles,
the rotor is operable with a variable rotor rotational speed, and
wherein the method comprises:
controlling the wind power installation using an operating characteristic, wherein the operating characteristic represents a relationship between the variable rotor rotational speed and an operating variable, wherein the operating characteristic has a first characteristic portion with a first rotational speed range, and a second characteristic portion with a second rotational speed range, wherein the first rotational speed range has lower rotational speeds than the second rotational speed range; and
configuring the operating characteristic by:
increasing values of the operating variable of the first characteristic portion in relation to an operating characteristic designated as optimum operating characteristic,
changing the operating variable of the second characteristic portion toward higher rotational speeds in relation to the operating characteristic designated as the optimum operating characteristic, and
coordinating the first and second characteristic portion of the operating characteristic with each other by increasing a rotational speed of the wind power installation in the second characteristic portion and decreasing a rotational speed of the wind power installation in the first characteristic portion, such that an expected total number of rotations of the rotor over a predetermined lifetime of the wind power installation does not exceed a total number predetermined for the operating characteristic designated as the optimum operating characteristic.

16. The method as claimed in claim 15, wherein:
the operating characteristic designated as the optimum is configured such that the wind power installation is operated in the first rotational speed range with an optimum tip-speed ratio at which a maximum power coefficient is reached, and
in response to configuring the operating characteristic, the wind power installation is not operated in the first rotational speed range with the optimum tip-speed ratio.

17. The method as claimed in claim 15, wherein:
at least one further operating characteristic is provided that is different from the operating characteristic, and the operating characteristic and the at least one further operating characteristic are used for different azimuthal orientations of the wind power installation,
wind characteristics in a region of the wind power installation are detected, and the operating characteristic and the at least one further operating characteristic are used for different wind characteristics, or
the variable rotor rotational speed in the second characteristic portion is greater for an azimuthal orientation in which the wind power is located in a wake region of a further wind power installation than for an azimuthal orientation in which the wind power installation is not located in a wake of a further wind power installation, and wherein the operating characteristic is provided for the azimuthal orientation in which the wind power installation is located in the wake of the further wind power installation.

18. The method as claimed in claim 15, wherein the wind power installation includes at least one detection device, for detecting a wind characteristic selected from a list of wind characteristics including:
wind shear,
wind turbulence, and
a local wind speed distribution,
wherein the operating characteristic is configured depending on the wind characteristic.

19. A wind power installation, comprising:
a rotor having rotor blades that have adjustable blade angles, the rotor is operable with a variable rotor rotational speed; and
an installation controller configured to:
control the wind power installation using an operating characteristic that represents a relationship between the variable rotor rotational speed and an operating variable, wherein the operating characteristic is implemented in the installation controller, and the operating characteristic has a first characteristic portion with a first rotational speed range, and a second characteristic portion with a second rotational speed range; and configure the operating characteristic in relation to a previous operating characteristic by:
increasing values of the operating variable of the first characteristic portion;
changing values of the operating variable of the second characteristic portion towards higher rotational speeds; and
increasing a rotational speed of the wind power installation in the second characteristic portion and decreasing a rotational speed of the wind power installation in the first characteristic portion, such that an expected total number of rotations of the rotor over a predetermined lifetime of the wind power installation remains substantially the same.

20. The wind power installation as claimed in claim 19, comprising:
at least one detection device configured to detect at least one wind property from a list of wind properties including:
wind shear,
wind turbulence, and
a local wind speed distribution,
wherein the operating characteristic is configured depending on the detected at least one wind property.

\* \* \* \* \*